April 11, 1950 J. D. HUGHSON 2,503,671
CONTINUOUS INDUCTIVE TRAIN CONTROL
AND CAB SIGNALING SYSTEM
Filed July 23, 1946 2 Sheets-Sheet 1
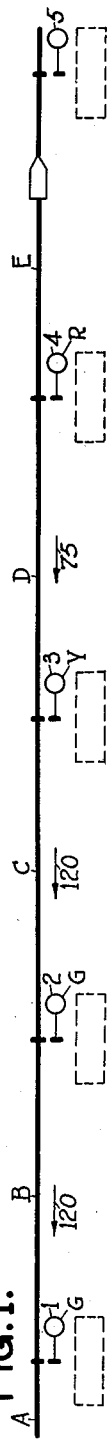
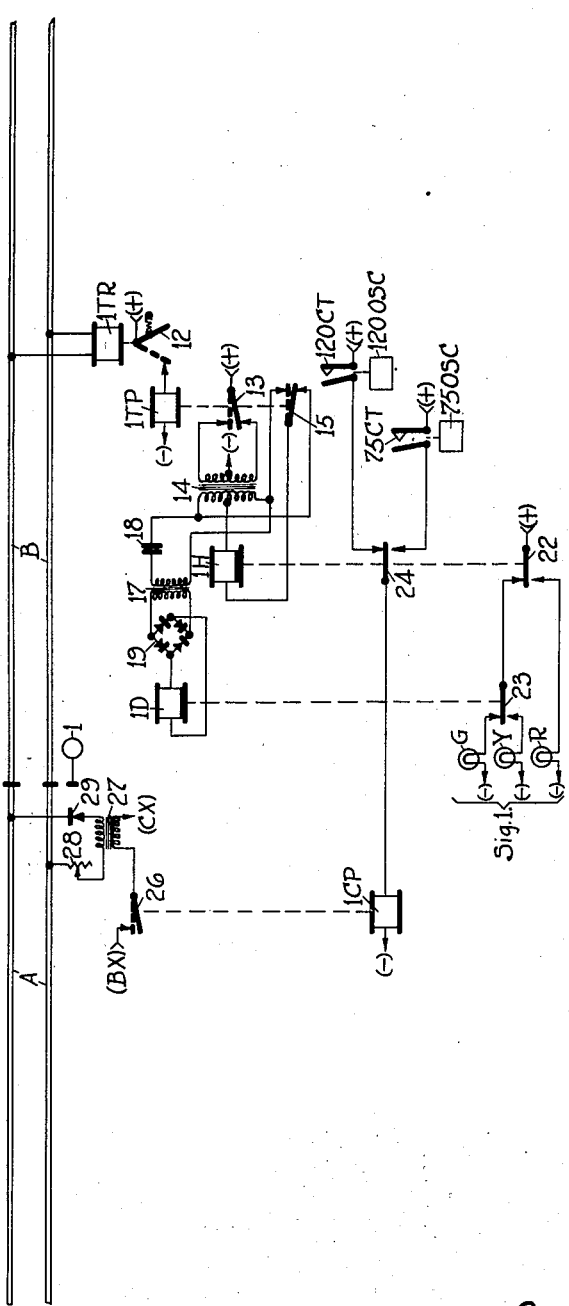
INVENTOR.
J. D. Hughson,
BY Neil W. Preston,
his ATTORNEY April 11, 1950

J. D. HUGHSON 2,503,671

CONTINUOUS INDUCTIVE TRAIN CONTROL
AND CAB SIGNALING SYSTEM

Filed July 23, 1946

INVENTOR.
J. D. Hughson,
BY Neil W. Preston,
his ATTORNEY

Patented Apr. 11, 1950

2,503,671

UNITED STATES PATENT OFFICE 2,503,671

CONTINUOUS INDUCTIVE TRAIN CONTROL AND CAB SIGNALING SYSTEM

J. Donald Hughson, Rochester, N. Y., assignor to General Railway Signal Company, Rochester, N. Y.

Application July 23, 1946, Serial No. 685,575

7 Claims. (Cl. 246—63)

This invention relates to cab signal and automatic train control systems of the continuous inductive type operated in connection with coded track circuits and for automatic block signal systems.

It is generally desirable to supply the power for the operation of coded track circuits, wayside signals and associated apparatus at the various signal locations of a typical automatic block signal system, from a power supply system operating at commercial frequencies, such at 60 cycles, since power at such a commercial frequency is usually available at various points along the railroad, and may be used as the primary or reserve source to provide a reliable and economic system of power supply for extensive signalled territory, in such a way that interruptions in the signalling facilities are not likely to be caused by power failures, even though batteries are not provided as reserve sources. In the usual type of coded continuous inductive control for cab signal or automatic train control systems, it is not feasible to employ the commercial frequency of the power supply system for the coded rail current, since various conditions in the way of grounds, leaks and the like tend to provide in certain territories stray currents in the track rails of commercial frequency of sufficient intensity to interfere with the proper coding operation of the vehicle carried equipment. Accordingly, in the usual type of system, the coded rail current comprises pulses of a special and distinctive frequency, such as 100 cycles, and the vehicle carried equipment is organized by tuned circuits or otherwise to respond to this particular frequency, but not to stray currents of the commercial 60 cycle frequency commonly encountered. The use of such a special frequency for all the signal locations over an extensive signal territory requires the transmission of such frequency for substantial distances, with provision for a suitable reserve source and the like, or the provision of a local apparatus at each signal location capable of creating the special cab signalling and train control frequency for each block by a suitable vibrator, frequency converter, or the like operated from the available power supply.

With these considerations in mind, and particularly in order to avoid the expense and complication of the equipment for providing a special frequency for cab signal and train control purposes, it is proposed in accordance with this invention to utilize the commercial frequency of the power supply system for providing suitable coded rail current which will cooperate with vehicle carried equipment in such a way that the existence of stray current of the commercial frequency in the track rails will not interfere with the proper coding operation of the vehicle carried equipment.

The primary object of this invention is to obtain this objective by simple and effective instrumentalities of conventional design and operation, with a minimum amount of complication and additional apparatus.

Generally speaking, and without attempting to define the nature and scope of the invention, it is proposed to energize the track rails of a direct current coded track circuit of the usual type with code pulses supplied from a source of alternating current of the same commercial frequency used for the power supply system of the signal system through a half-wave or full wave rectifier, so that each code pulse is formed of a number of half-cycles, and to provide vehicle carried equipment which is organized by suitable tuning or the like to respond selectively to an even harmonic, preferably the second harmonic, of the fundamental current frequency. With this kind of coded rail current and type of vehicle carried equipment, the code pulses in the track rails of a selected rate serve to actuate the code responsive apparatus on the vehicle, while stray alternating current in the rails will not cause such operation. This discrimination is due to a well known fact that a symmetrical alternating current of a given frequency may include third or other odd harmonics of the fundamental frequency, but is substantially lacking in the second and even harmonics; whereas an unsymmetrical half-cycle current has a substantial percentage of the second and other even harmonics, so that equipment tuned to the second harmonic will respond to half-cycle currents but not to full-cycle currents.

Various other objects, characteristic features, attributes and advantages of the system of this invention will be in part apparent, and in part pointed out, as the description progresses.

The accompanying drawings illustrate one specific embodiment of the invention in a diagrammatic and conventional manner, the parts and circuits being illustrated more with the view of facilitating an explanation and understanding of the invention, than for the purpose of illustrating in detail the structures preferably employed in practice. In these drawings—

Fig. 1 is a diagrammatic representation of a stretch of railroad track equipped in accordance with this invention, without any illustration of the parts and circuits for the various signal locations;

Fig. 2 illustrates the relays and circuits for one typical signal location;

Fig. 3 is a diagrammatic representation of the type of coded rail current provided in this system.

Figure 4:
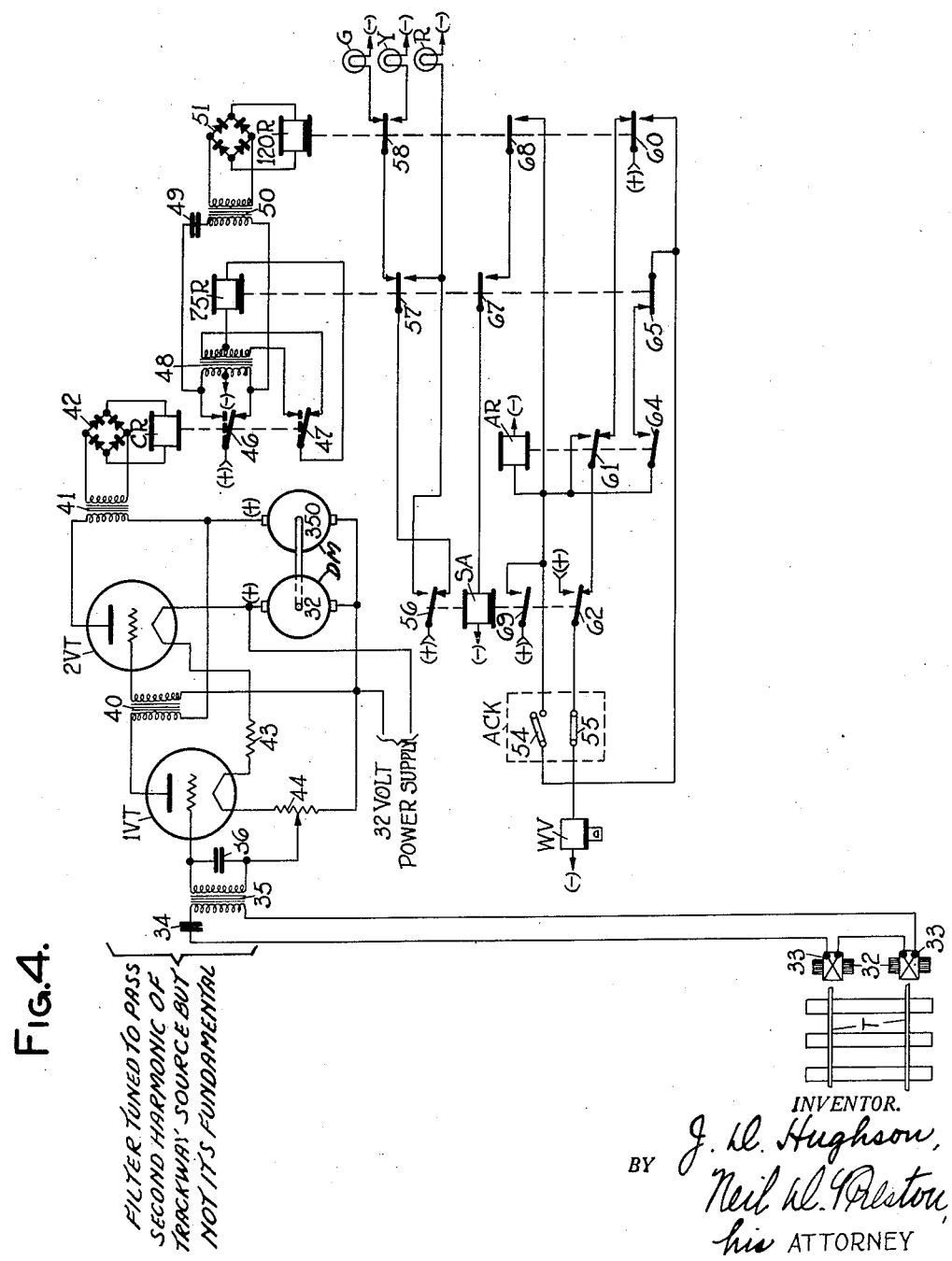
Fig. 4 illustrates one typical form of the vehicle carried equipment of the system.

In these drawings, for the purpose of simplifying the illustration of the circuit connections, the symbols (+) and (—), and associated arrows suggesting flow of current into and out of the circuit connections shown, are employed to designate the opposite terminals of the local source of direct current for operating various relays and the signals of the system. Similarly, the symbols (BX) and (CX) are employed to designate the opposite terminals of a transformer winding or the like energized with alternating current. The relays are illustrated in a conventional manner with their contact fingers located either above or below the representation of the coil or winding of the relay and associated therewith by dash lines, the contact fingers being shown in the lower position when the relay is deenergized and in the upper position when the relay is energized. Certain relays, such as the transmitter relays and the code following track relays, which are being intermittently energized and deenergized at some code rate, are indicated as being in continuous operation by illustrating the contact fingers by dotted and solid lines. Various other conventions employed in the drawings will be readily understood as the structure and operation of the system are described.

*Trackway apparatus.*—It is contemplated that the system of this invention will be used to provide a suitable form of cab signalling or automatic train control system for stretches of track equipped for automatic block signalling, with or without fixed wayside signals, and employing direct current coded track circuits. Although the invention is applicable to signalling for single track railroads, stretches of multiple tracks signalled for train movement in both directions, and for various other applications in interlocked territory and the like, it has been assumed for simplicity that the system is applied to a stretch of multiple track, such as diagrammatically indicated in Fig. 1, which is divided by insulated joints into blocks A, B, etc., of the appropriate length, and provided with wayside signals 1, 2, etc. at the entrance to these blocks for governing train movement in one direction only. It is also assumed that each of these blocks comprises one coded track circuit, although it should be understood that this invention can be applied where cut sections are employed by relaying the code past such cut sections in accordance with the usual practice.

Each of the coded track circuits is operable to provide control codes of different predetermined characters for governing indications of the wayside signals and the vehicle carried cab signal or train control equipment; and for simplicity it is assumed that these coded track circuits can be operated to provide two different code rates, such as 75 and 120 times a minute, for a conventional arrangement of signal indications of green for proceed, yellow for caution, and red for stop. With such an organization, if a train is present in the block E as indicated in Fig. 1, a 75 caution code is transmitted in the next block D in the rear, and 120 clear code is transmitted in the blocks C and B.

In the type of system assumed, the code transmitting and receiving apparatus and associated parts are the same at each of the several signal locations; and an explanation of the relays and circuits for one signal location will serve for all.

Referring to Fig. 2, which illustrates the parts and circuits for a typical signal location 1, a code following track relay ITR is connected across the track rails at the entrance end of the block B. This track relay ITR is preferably of the biased polar type, with a low resistance and other structural and operating characteristics suitable for its purpose, in accordance with recognized practice. The operation of the contact finger 12 of this track relay ITR from the position shown to the dotted line position energizes a quick acting repeater relay ITP by an obvious circuit; and in the arrangement shown, the intermittent operation of this repeater relay ITP in response to code pulses controls the energization of home and distant relays IH and ID through suitable decoding means. In the particular arrangement shown, one contact finger 13 of the repeater relay ITP energizes two halves of the primary of a decoding transformer 14 through obvious circuit connections as this relay is intermittently operated. The secondary of this decoding transformer 14 is connected through another contact finger 15 of relay ITP, acting as rectifying contacts, to the winding of the slow release home relay IH, so that this relay is maintained energized by the intermittent operation of the relay ITP at any code rate, but is deenergized if this repeater relay is maintained steadily energized or deenergized. The secondary of the decoding transformer 14 is also connected to the primary of a coupling transformer 17 through a condenser 18 providing maximum current for the clear 120 code rate; and the secondary of the coupling transformer 17 is connected through the full-wave rectifier 19 of the usual type to the slow releasing distant relay ID, so that this distant relay ID is energized only when the track relay ITR and its repeater relay ITP are operated at the 120 code rate.

The home relay IH and the distant relay ID may control the indications of any suitable type of wayside signal 1 by means of any one of the well known signal control circuits. As shown, it is assumed that the signal 1 is of the color light type having three different lamps G, Y and R for giving when lighted the desired green, yellow and red indication; and the lighting circuits for these lamps G, Y, and R are controlled by contacts 22 and 23 of the relays IH and ID in a manner readily understood to provide a clear green indication, when both relays IH and ID are energized, a yellow caution indication when the relay IH alone is energized, and the red stop indication when the relay IH is deenergized.

The apparatus for each signal location also includes means for applying to the exit end of the block in the rear code pulses of a selected code rate. Referring to Fig. 2, a transmitter relay ICP is arranged to be energized by obvious circuits governed by front and back contacts 24 of the relay IH and including coding contacts, illustrated conventionally and designated 75CT and 120CT, which are intermittently operated by a suitable coding device, such as a code oscillator of the type disclosed, for example, in the patent to O. S. Field No. 2,351,588, June 20, 1944. It can be seen that when the block B is occupied, and the relay IH is deenergized the transmitter relay ICP for the block A is operated by the coding contact 75CT to provide the 75 caution code for block A. If the block B is not occupied, and the relay IH is energized, the transmitter relay ICP is operated at the 120 code rate.

The transmitter relay ICP closes through its front contact 26 a circuit readily traced on the drawing from (BX) to (CX) for energizing the primary of a track transformer 27 with alternating current each time the transmitter relay ICP is energized. The secondary of the transformer 27 is connected by obvious circuit connections across the track rails at the exit end of the block A in series with an adjustable limiting resistance 28 and a half-wave rectifier 29 of suitable type, preferably a rectifier of the copper oxide or selenium type.

It can be seen that each time the transmitter relay ICP is energized, either at the 75 or 120 code rate, the primary of the track transformer 27 is energized with alternating current, and that the rectifier 29 permits half-cycles of this alternating current to flow to the track rails, thereby providing code pulses consisting of a number of half-cycles of the fundamental frequency, as diagrammatically indicated in Fig. 3. The number of the cycles in each code pulse depends of course upon the code rate; and for a 75 caution code, having an "on" period of normally .4 second, the code pulse comprises approximately 24 half-cycles.

Although the code pulses for energizing the track rails of the typical block A are fluctuating in intensity, the voltage and current is unidirectional, and the code pulse as a whole has a direct current component acting the same as a steady current to operate the code following track relay TR for this block, thereby energizing and deenergizing this track relay in accordance with the code rate, the same as if pulses were derived from a steady source of direct current, rather than comprising half-cycle impulses extending over the "on" period. In this connection, it can be appreciated that the peak voltage of the half-cycle impulses required for operating the track relay will be higher than the voltage for a sustained steady code pulse. Among other things, this higher peak voltage for the transmission of the same relay operating current may be said to be helpful in tending to break down the resistance of any film on the track rails, and thereby facilitate shunting of the track circuit. In the drawing of Fig. 2 and the above description only half wave rectifiers have been shown and described in connection with the application of code pulses to the trackway, but it should be understood that the halfway rectifying unit 29, for example, may be replaced by a full wave rectifier if desired. Such a use of a full wave rectifier will give the same operation and features of the present invention as a half wave rectifier, since it causes half cycles of alternating current to be applied to the track at a rate corresponding to the second even harmonic of the basic 60 cycle frequency of the wayside source of energy. Since the full wave rectifier provides a greater number of half cycles for each code pulse, it will be readily apparent that the direct current component of the pulses will be greater if the same peak voltages of alternating current are employed. However, it is possible with this modification of the organization to so adjust the track circuit as to give the same direct current component as when only a half wave rectifier is provided, because the resulting effect upon the train carried apparatus remains the same.

*Vehicle equipment.*—It is contemplated that this invention will be employed in connection with any suitable form of cab signal or automatic train control system of the coded type, involving cab signals, acknowledgment, enforced speed control, or having any other desired characteristics. The primary purpose of this invention is to provide a type of such cab signal or train control equipment for locomotives or other vehicles which will respond to the code pulses of half-cycle rectified alternating current in the track rails, but will not respond to stray alternating current of the same frequency in the track rails. In effect, this objective is accomplished by organizing the vehicle carried equipment to be responsive to the second or some other even harmonic, of the fundamental frequency used for providing the half-wave rectified code pulses. Such discrimination may be made in various ways; and it should be understood that this specific arrangement illustrated in Fig. 4 is merely typical or illustrative.

Referring to this particular organization of vehicle carried equipment shown in Fig. 4, the vehicle carries two receivers at its leading end in front of the first pair of wheels and axles, each of which comprises a laminated iron core 32 and a coil 33, such as disclosed for example in the patent to Reichard, No. 1,654,487, December 27, 1927, which is disposed in inductive relation directly over one of the track rails T. These receiver coils 33 are wound and connected so that the voltage induced therein by rail current going in opposite directions in the track rails act accumulatively to supply a small voltage to a circuit including a tuning condenser 34 and the primary of a transformer 35, which couples the receiving coils to a suitable amplifying and filtering organization. As illustrated, another condenser 36 is connected across the secondary of this transformer; and these two condensers 34 and 36 in the primary and secondary circuits of this coupling transformer 35 are chosen or adjusted for resonance at the second harmonic of the fundamental track frequency, or if desired to some other even harmonic. Assuming the frequency for supplying coded current to the track rails through the half-wave rectifier 29 is the conventional 60 cycle frequency, then the coupling transformer 35 is tuned for 120 cycles. In other words, the output voltage from the coupling transformer 35 is the maximum for excitation of the receiver coils 33 at 120 cycles.

It is well recognized that an unsymmetrical wave, such as a half-cycle of a fundamental frequency, has a large percentage of the even and odd harmonics, while a symmetrical wave, corresponding with the fundamental frequency, even though somewhat distorted, has substantially no even harmonic. This is particularly true of the usual sine wave of alternate currents generated by rotating machinery and commonly used for power transmission and distribution.

On account of this fundamental distinction in the harmonic content of a half-cycle of a fundamental frequency of alternating current, and the full cycle of such alternating current, it can be appreciated that vehicle carried equipment made distinctively responsive to the second harmonic of the fundamental frequency will be operated effectively by code pulses formed of half cycles, but will not respond to the full cycles of stray alternating currents in the track rails which are sometimes encountered in the track rails of railroads in certain territories due to conditions of leakage or otherwise from power supply system of a railroad or some other source of the same frequency. Consequently, stray alternating current in the track rails will not interfere with the proper coding operation of the vehicle carried equipment in response to the distinctive character of the code pulses in the system of this invention where this equipment is selectively tuned for the second harmonic of such stray alternating current. It can be appreciated that, in the absence of such discrimination, a stray current in the track rails would interfere with the proper coding operation, if of sufficient intensity, by maintaining the code following relay energized and creating an improper stop condition, in spite of the fact that the track rails might be energized with legitimate code pulses.

The output of the receiver coils 33 and associated tuned circuits is amplified and employed to operate a code following master relay CR by any one of the well known forms of apparatus and circuits commonly used for this purpose. In the specific organization shown, the tuned secondary of the coupling transformer 35 is connected to the grid circuit of a voltage amplifier tube IVT of the appropriate operating characteristics, such as the tube known as PJ2; and the plate circuit of this tube IVT is connected by an inter-stage transformer 40 to the grid circuit of a power tube 2VT of the appropriate operating characteristics such as the tube known as PJ4. The plate circuit of the power tube 2VT supplies current to the primary of an output transformer 41, which has its secondary connected through a full-wave rectifier 42 of the usual type to the master code following relay CR.

A convenient power supply system for steam locomotives comprises a dynamotor operated from the headlight turbo-generator on the locomotive, usually 32 volts, and providing the appropriate voltage for plate supply of the vacuum tubes, such as 350 volts. Such a dynamotor is illustrated diagrammatically as DM; and it can be readily seen that the plate circuits of the tubes IVT and 2VT are energized at 350 volts, while the filaments or cathodes of these tubes are energized in series from the 32 volt source, with resistances 43, 44 to afford the necessary grid bias.

The master relay CR, which is energized for each code pulse of the rail current, and is deenergized during the "off" intervals between such code pulses, is arranged to govern the energization of code responsive relays 75R and 120R, through the agency of decoding means similar to that used in connection with the code following track relay ITR, and previously explained. The contact fingers 46, 47 of the relay CR govern the energization of a decoding transformer 48 and the energizing circuit for the relay 75R, so that this relay is energized if the master relay CR is intermittently energized at either code rate. The secondary of the decoding transformer 48 is connected through a condenser 49 to the primary of a coupling transformer 50, and the secondary of this transformer is connected through a full-wave rectifier 51 to the code responsive relay 120R. The condenser 49 has a value to provide maximum output current for energization of the relay 120R, when the master relay CR is intermittently operated at the clear or 120 code rate.

It can be readily seen that when the vehicle is travelling in a clear block provided with code pulses at the 120 code rate, such as the block B or C in Fig. 1, both of the relays 75R and 120R are energized. When the vehicle enters the caution block, such as the block D in Fig. 1, and the code rate is changed to 75, the relay 120R releases; and if the train should advance into a block occupied by another train, as the block E in Fig. 1, the wheel shunt of this other train will act to cut off coded rail current to the following train, thereby causing the intermittent operation of the master relay CR to cease and releasing the relay 75R.

Any suitable form of cab signal or automatic train control apparatus may be associated with the code responsive relay 75R and 120R; and the simplified arrangement illustrated for a cab signal system with manual acknowledgement for each restrictive indication along the lines disclosed in the patent to W. H. Reichard No. 2,250,235, July 22, 1941, is merely typical or representative of such a suitable type of system.

Briefly considering the structure and operation of this type of cab signal and acknowledgement system, an electropneumatic valve WV acts when deenergized to sound an air whistle as an audible signal. The energization of this whistle valve WV is controlled by contacts of the code responsive relays 75R, 120R, in conjuction with contacts of an acknowledging relay AR and a slow acting relay SA governed by the actuation of a manually operable acknowledging contactor ACK of the well known form. This acknowledging contactor ACK, illustrated diagrammatically, comprises a normally open contact 54, which is closed when the engineman operates the handle, and a normally closed contact 55, which is automatically opened when the handle is moved to its operated position.

When the vehicle is travelling in a clear block and the relays 75R and 120R are energized as shown, a clear cab signal lamp G is lighted by a circuit readily traced through a back contact 56 of relay SA and front contacts 57, 58 of relays 75R and 120R. Under these clear conditions, the whistle valve WV is energized by a circuit from (+), through front contact 60 of relay 120R, back contact 61 of relay AR, back contact 62 of relay SA, normally closed contact 55 of the acknowledging contactor ACK, and operating magnet of the whistle valve WV, to (—).

Assume now that a vehicle with its apparatus in its normal celar condition shown enters a caution block, and the relay 120R is released, while the relay 75R remains energized. The release of relay 120R operates its contact finger 58 to extinguish the green cab signal lamp G and light the yellow cab signal lamp Y. Also, the release of the relay 120R opens its front contact 60 to interrupt the energizing circuit above traced for the whistle valve WV, thereby giving the desired audible warning that the vehicle has received a restrictive cab indication. If the engineman operates the acknowledging contactor ACK in recognition of this warning to close the normally open contacts 54, the relay AR is energized by a circuit which may be traced from (+), through back contact 60 of relay 120R, contact 54 of the acknowledging contactor, and winding of relay AR, to (—). This energization of the relay AR and closure of its front contact 64 establishes a stick circuit for this relay AR readily traced through back contact 60 of relay 120R, front contact 65 of relay 75R, and front contact 64 of relay AR. The energization of the relay AR also closes its front contact 61 to establish an energizing circuit for the whistle valve WV through contacts 60, 65 of relays 120R and 75R and the front contacts 64, 61 in series of relays AR, thereby discontinuing the audible signal.

If the vehicle should enter an occupied block, the relay 75R is deenergized to operate its contact finger 57 to extinguish the yellow cab signal lamp Y and light the red cab signal lamp R. Also, the release of relay 75R opens its front contact 65 to deenergize the whistle valve WV and also open the stick circuit for the relay AR. This gives the audible warning signal the same as when the vehicle enters the caution block. If the engineman acknowledges this warning and actuates the acknowledging contactor, the relay AR is again energized by the same circuit above mentioned, and also current supplied through the back contacts 67 and 68 in series of the relays 75R and 120R to the relay SA. The energization of the relay SA closes its front contact 62 to energize the whistle valve WV, and also closes a front contact 69 to provide a stick circuit for this relay SA including the back contacts 67, 68 of relays 75R and 120R. Also, the energization of the relay SA opens at its back contact 56 the circuits for lighting the green and yellow cab lights G and Y and establishes a circuit for maintaining the red cab signal light lighted independently of the back contact 57 of the relay 75R. Thus, the stop or red cab signal indication is maintained until the relay SA, which is preferably somewhat slow releasing as indicated, is deenergized by restoration of the coding and energization of the relay 75R. This arrangement is preferably employed so that a momentary energization of the code responsive relay 75R will not cancel the stop indication.

Whenever the cab signal indication changes from yellow to green, there is a momentary deenergization of the whistle valve during the movement of the contact finger 60 of the relay 120R and release of the relay AR. The whistle valve WV may be made sufficiently slow releasing by any one of the well known expedients to prevent sounding a warning signal by such momentary deenergization, if so desired; or a temporary sounding of the warning signal may be employed to advise the engineman of the change in cab signal indications.

The particular organization of cab signal and acknowledgment control just explained is merely representative of a suitable type of system which may be controlled in accordance with this invention. The significant feature of this invention relates to the provision of means for employing commercial frequencies for rail current and avoiding interference by stray currents of the same frequency; and the particular type of pickup, amplifying, decoding and cab signal or train control equipment is not material. Also, the particular tuning arrangement illustrated for discriminating between the second or an even harmonic of the fundamental commercial frequency and stray currents of that frequency may take any other suitable form, including single or multiple stage filters or other expedients. Various other adaptations, modifications, and additions may be made to the particular organization of parts and circuits shown and described without departing from the invention.

What I claim is:

1. Continuous inductive control system of the coded type for cab signalling and automatic train control comprising half cycles of alternating current of a commercial frequency, vehicle carried equipment including a master code following relay, receiving coils in inductive relation to the track rails and an amplifier for governing the energization of said master relay in response to the code pulses in the track rails, and means including circuit elements associated with said receiving coils and amplifier tuned to an even harmonic of said commercial frequency, whereby said master relay is energized in response to code pulses of half cycles of said commercial frequency but not to the full cycles of stray current of the same frequency.

2. A system of continuous inductive control for cab signalling or automatic train control comprising, in combination with a plurality of blocks having their track rails energized with code pulses of a code rate dependent upon traffic conditions, each pulse including a plurality of half cycles of alternating current of a commercial frequency, of vehicle carried equipment including receivers in inductive relation to the track rails and associated circuit elements tuned to an even harmonic of said alternating current, a code following master relay energized in response to excitation of said receiver coils by such even harmonic, and decoding means distinctively responsive to the rate of intermittent operation of said code following relay.

3. A system of inductive control for cab signalling or automatic train control comprising, in combination with coded track circuits energized with code pulses of a distinctive rate dependent upon traffic conditions, each of said code pulses including a plurality of half cycles of alternating current of a commercial frequency, of vehicle carried equipment including a pair of receiver coils in inductive relation to the track rails, a voltage and power amplifier, means including circuit elements tuned for the second harmonic of said commercial frequency for coupling said receiver coils to said amplifier, a master code following relay energized by the output of said amplifier, and decoding means distinctively responsive to the rate of intermittent operation of said master relay.

4. In a cab signal or automatic train control system, a stretch of track provided with a plurality of coded track circuits energized from a source of alternating current of a commercial frequency through a half-wave rectifier so as to provide code pulses each comprising a plurality of half cycles of said frequency, vehicle carried equipment comprising pick-up coils in inductive relation to the track rails and amplifying means including circuit elements tuned for the second harmonic of said frequency, a master code following relay on the vehicle energized by the output of said amplifier, and decoding means including a plurality of code responsive relays governed in accordance with the rate of the intermittent actuation of said master relay.

5. In a cab signal automatic train controlled system of the coded continuous inductive control type, a plurality of coded track circuits each including a direct current code following track relay and a transmitter relay, said transmitter relay acting to connect a source of alternating current of a commercial frequency across the track rails in series with rectifier to provide energization of the track rails with code pulses of rectified uni-directional current for operation of the associated track relay, means for operating said transmitter relay of each track circuit at different code rates dependent upon traffic conditions, and vehicle carried receiving and amplifying equipment tuned to an even harmonic of said alternating current for operating a master code following relay on the vehicle in accordance with the rate of code pulses existing in the track rails ahead of such vehicle.

6. In an automatic train control or cab signal system of the continuous inductive control type, vehicle equipment for detecting the energization of the track rails by half cycles of a commercial frequency comprising, receiver coils in inductive relation to the track rails, a master relay, and means including an amplifier and circuit elements tuned to the second harmonic of said frequency for operatively connecting said receiver coils to said master relay and causing operation of said relay in response to energization of the track rails by half cycles but not by full cycles of said frequency.

7. In an automatic train control system of the continuous inductive type, a stretch of track divided into a plurality of coded track circuits each comprising a code transmitter at one end for applying code pulses at different rates depending upon traffic conditions with each pulse of any rate being formed by a plurality of half-cycles of alternating current of a particular frequency and a direct current code receiving relay at the other end governed by the codes of different rates or the absence of code for controlling the code transmitter for the track circuit next in the rear thereof, a vehicle carried equipment comprising pick up coils having an inductive relation to the track rails and amplifying means including circuit elements tuned to pass the second harmonic of said particular frequency but not its fundamental, a master code following relay on the vehicle energized by the output of said amplifier, and decoding means including a plurality of code responsive relays governed in accordance with the rate of the intermittent actuation of said master relay, whereby said vehicle carried equipment is unresponsive to stray currents of said particular frequency in the track rails of said trackway because of the insufficient content of the second harmonic frequency in such stray currents to cause an effective output of said amplifier for operation of said master relay.

J. DONALD HUGHSON.

REFERENCES CITED

The following references are of record in the file of this patent:

UNITED STATES PATENTS

| Number | Name | Date |
|---|---|---|
| 1,590,839 | Lucas | June 29, 1926 |
| 1,626,928 | Geiger | May 3, 1927 |
| 1,791,780 | Williamson | Feb. 10, 1931 |
| 1,824,605 | Lewis | Sept. 22, 1931 |
| 1,912,923 | Thompson | June 6, 1933 |
| 1,933,680 | Ohl | Nov. 7, 1933 |